United States Defensive Publication [19] (H) [11] T104,304

Hsieh et al. [43] Jun. 5, 1984

[54] METHOD OF BENEFICIATING HIGH CARBONATE PHOSPHATE ORE

[76] Inventors: Shuang-shii Hsieh, 1622 Bridlewood Dr.; James R. Lehr, 124 Riverview Dr., both of Florence, Ala. 35630

[21] Appl. No.: 525,073

[22] Filed: Aug. 22, 1983

[51] Int. Cl.[3] ..... B03D 1/14

[52] U.S. Cl. ..... 209/166; 252/61

[57] ABSTRACT

A phosphate ore flotation process subjecting a phosphate ore containing carbonate mineral impurities to froth flotation in the presence of modifying agents, said modifying agents being alkyl phosphonic acids and hydrofluoric acid, and a collector, said collector being fatty acids; collecting the phosphate and carbonate minerals as rougher concentrate from the overflow; subjecting the phosphate and carbonate mineral concentrate to a differential desorption with an acid to remove the fatty acid from the surface of the phosphate mineral; removing the separated carbonate minerals from the overflow; and recovering the phosphate values in the underflow.

5 Claims, No Sheets Drawing,

15 Pages Specification

The file of this unexamined application may be inspected and copies thereof may be purchased (849 O.G. 1221, Apr. 9, 1968).